Patented Jan. 30, 1934

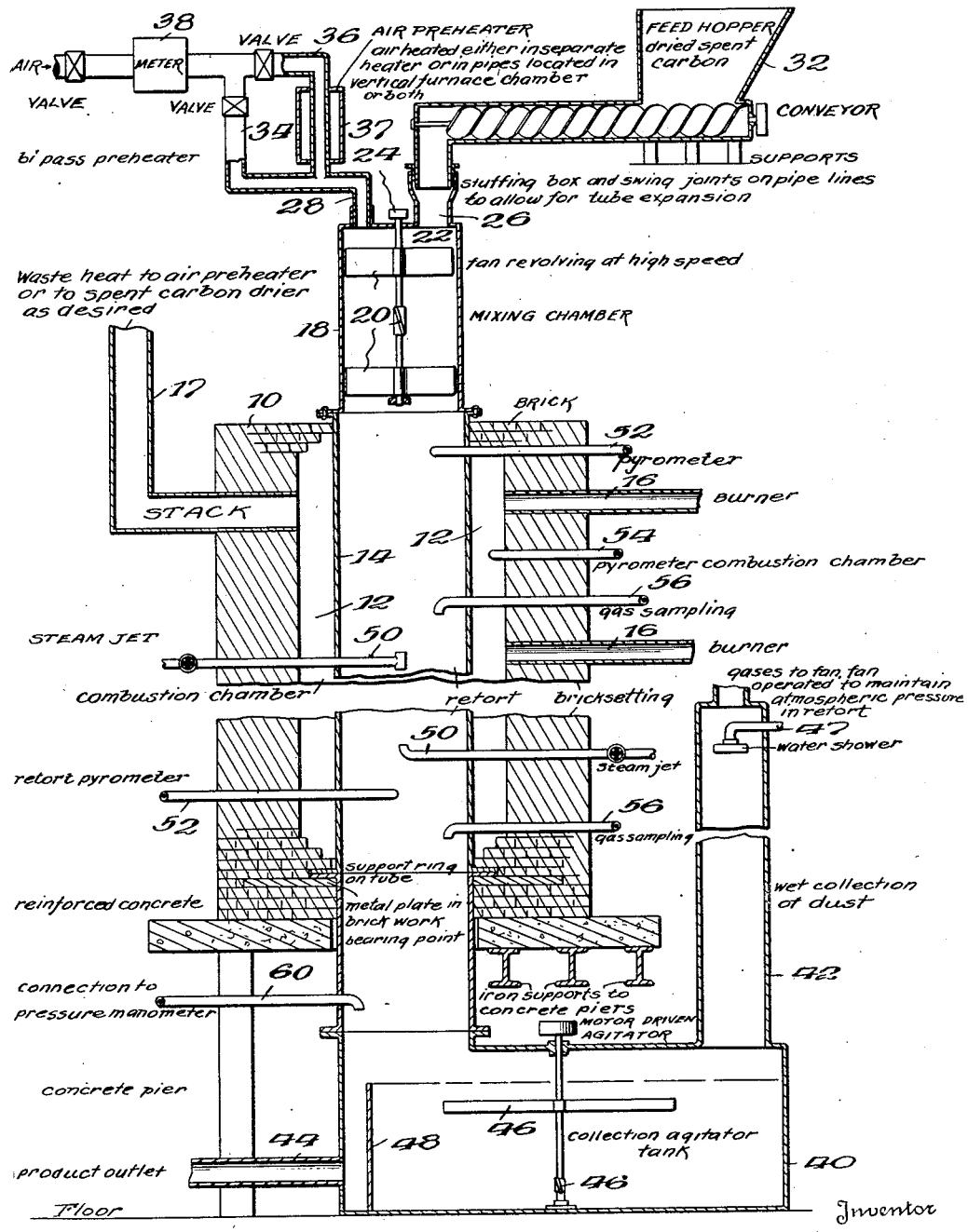

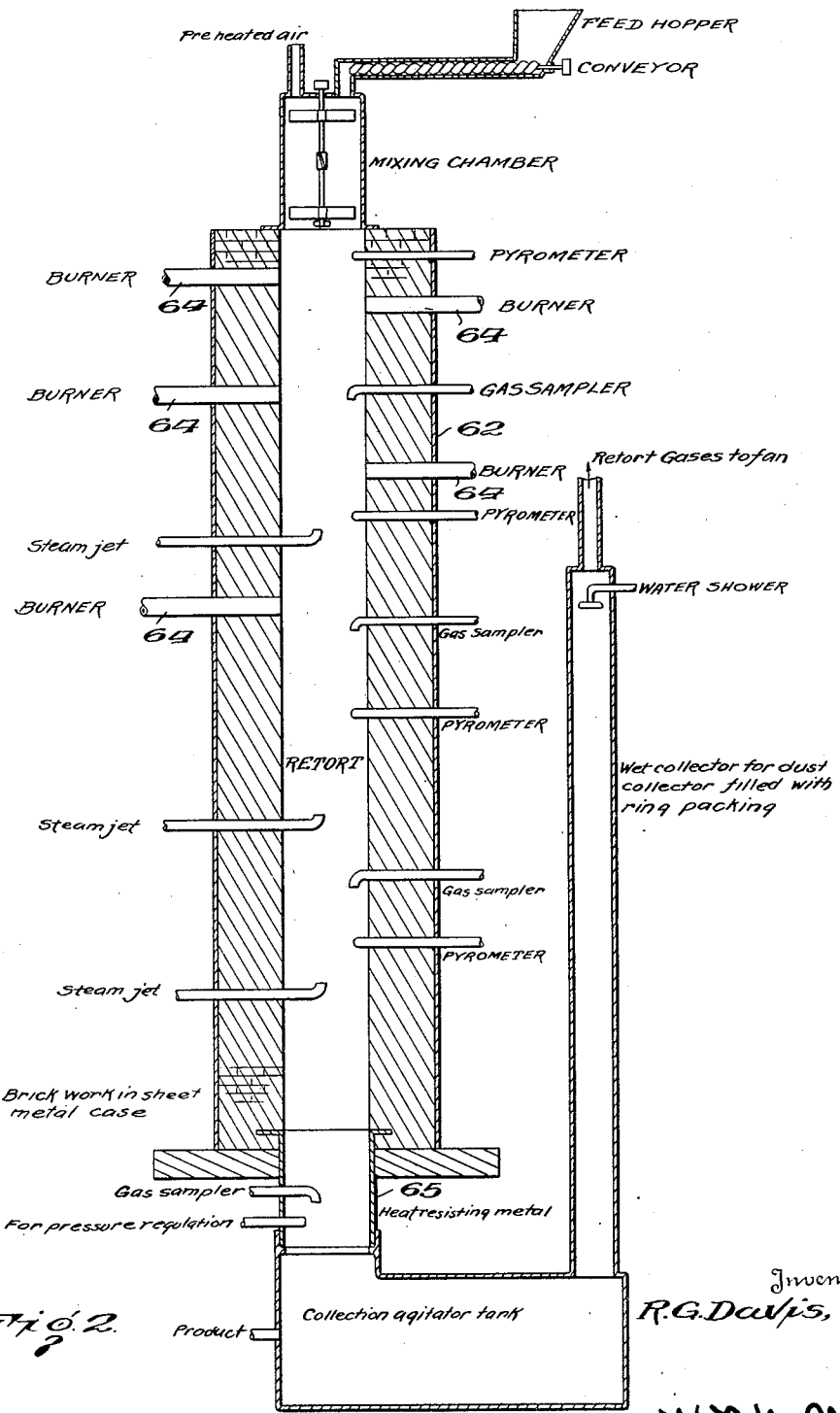

1,945,479

UNITED STATES PATENT OFFICE 1,945,479

MEANS AND METHOD FOR REVIVIFYING SPENT ACTIVATED CARBON

Raymond G. Davis, Wilmington, Del., assignor to Darco Corporation, Wilmington, Del., a corporation of Delaware Application November 12, 1932
Serial No. 642,452

6 Claims. (Cl. 252—3)

This invention relates to improvements in means and methods for revivifying spent activated carbon; and it comprises an organization of apparatus useful in igniting and selectively burning out with air adsorbed matter contained in spent carbons wherein a stationary elongated vertically disposed heating retort supports a mixing chamber delivering into the top of said retort and having regulated air introducing means and conveying means adjustably feeding powdered spent carbon into said chamber, said retort being provided in its upper portion with heating means and below the heating means with a plurality of inlet pipes for injecting cooling gases at different points along the length of the retort, and the lower end of said retort being arranged to deliver into a collection tank adapted to separate the revivified product from the reaction gases; and it further comprises a process of restoring the activity of spent activated carbon containing adsorbed organic matter by igniting a dispersed mixture of the spent carbon with air and selectively burning out adsorbed matter wherein spent carbon is mixed and dispersed in a current of air regulated in relative amount to that required to oxidize the adsorbed organic matter and the dispersion mixture is passed in a continuous current downward through an elongated vertical retort, the upper portion of said retort being kept at temperatures about 800° to 1100° C. by aid of externally applied heat or otherwise and the dispersion mixture being thereby ignited, the ignited dispersion mixture being somewhat cooled in its passage through the lower portion of the retort by injection of a cooling gas thereinto and the revivified carbon being then separated from the gaseous reaction products; all as more fully hereinafter set forth and as claimed.

In my Patent No. 1,873,998 I have described and claimed a process of revivifying spent carbon containing adsorbed organic matter by igniting a dispersed mixture of powdered spent carbon with air by continuously passing a current of such dispersion mixture horizontally through a tube heated to about 800 to 1000° C. and so regulating the air ratio in proportion to the quantity of adsorbed matter in the spent carbon, the time of heating and the temperature of the tube that the adsorbed matter is selectively burned out without any substantial loss of the original activated carbon, regulation of the heating being sometimes aided by introducing steam with the air-carbon mixture. In the process of said patent yields of reactivated carbon substantially over 90 per cent of the weight of the original activated carbon are obtained, the reactivated carbon having an adsorbent activity substantially over 90 per cent of that of the original activated carbon.

In my Patent No. 1,875,223 I have described and claimed an organization of apparatus useful in performance of the method of my said Patent No. 1,873,998 and comprising a rotating externally heated horizontal tube, a stationary charge head fitted around one end of said tube, a horizontal conveyor extending through said charge head into the tube and means for introducing a regulated current of air into said chamber to pass around the conveyor into the tube, the arrangement of the rotating tube, charge head, conveyor and air introducing means being adapted to form within the tube a dispersed mixture of finely divided carbon and air in regulated proportions and to carry said dispersed mixture through the tube by the force of the air current.

In the present invention I provide improved methodical means for selectively burning out of spent carbon the adsorbed organic matter contained therein and for so regulating the essential conditions necessary for such selective oxidation as to obtain yields of reactivated product nearly equal in amount to the original activated carbon and having an adsorbing activity approximating closely that of the original activated carbon.

I have found that the revivification of the spent carbon by ignition of a dispersed mixture of the carbon in a definitely limited amount of air is readily controlled for the purpose in view by utilizing a stationary vertical tube or retort heated in its upper portion only, the heated tube or retort supporting upon its top a mixing chamber provided with means for introducing thereinto a feed of spent carbon in powdered form and also with positive means for introducing a regulated air current, there being provided within the mixing chamber mechanism for agitating the carbon and air together and thus thoroughly mixing and dispersing the powdered material in the air current for delivery from the bottom of the mixing chamber into the heated retort. The dispersion mixture of spent carbon and air is passed in a continuous current downwardly through the heated retort, being ignited in the heated upper portion and the ignited mixture is subjected in the lower portion of the retort to a cooling action effected by introducing into this lower portion cooling gases such as steam or products of combustion which mingle with the dispersed mixture of carbon and reaction gases and pass therewith through the bottom of the retort into a collecting tank provided with a gas outlet and with a separate outlet for the reactivated product. For the regulation of the process the stationary vertical retort is readily provided along its length with gas sampling tubes, with pyrometer tubes and with pressure manometer connections so that the composition, temperature and pressure of the gases within the retort can be readily observed and the conditions within the retort can be controlled with a nicety which enables a continuous selective oxidation of the adsorbed matter in the spent carbon substantially without loss of the activated carbon itself. The yield and acivity of the reactivated product may even exceed 100 per cent compared with the original activated carbon. This is because in my process some of the adsorbed organic matter is or may be converted into charcoal having high activity.

By igniting the dispersion mixture passed in a continuous current downwardly through a reaction retort maintained at a temperature around 800° to 1100° C. in its upper portion, full advantage may be taken of the exothermic action of the oxidation associated with the ignition. By carefully regulating the air ratio in proportion to the content of adsorbed organic matter and by also regulating the temperature, selective combustion of the adsorbed matter may be effected with production of $CO_2$ and $H_2O$ without substantial amounts of CO and $H_2$. With adequate speed of operation the heat developed by this combustion may be sufficient to maintain the desired temperature in the upper portion of the retort with the aid of but little additional heat from outside sources. It is even possible in some cases to operate the apparatus without the application of heat other than that developed in the process. In a heavily insulated retort brought up to the desired high temperature by flames of burning gases in the retort or otherwise, continuous ignition and combustion in the upper portion of the retort may be effected and in some cases the continuous ignition and combustion, once started, are maintained without the flame of burning gases. Ordinarily the outside heating means allows a closed regulation of the temperature conditions within the retort but outside heat is not always needed. By preheating the air on its way to the mixing chamber the requirement of externally applied heat for maintaining a high temperature in the ignition zone is or may be reduced to a minimum.

In determining the ratio of the air current in which the spent carbon is dispersed prior to ignition, the composition of the adsorbed organic matter is, of course, a vital factor. The proportion of air varies according to the type and composition of the adsorbed matter. I have found in practice that the proportion of air required for selective combustion of the adsorbed matter in spent carbon ranges between 65 cubic feet and 130 cubic feet per pound of adsorbed matter in the carbon, depending upon the use in which the carbon was spent and thus upon the composition of the adsorbed matter. In decolorizing sugar solutions, for example, in some cases the matter adsorbed may be of a composition closely approximating that of cane sugar, a pound of which, in burning to $CO_2$ and $H_2O$, theoretically requires about 63 cubic feet of air, measured under ordinary atmospheric conditions. For spent carbons containing adsorbed matter of greater carbon and hydrogen, and less oxygen contents than cane sugar, the proportions of air required for combustion to $CO_2$ and $H_2O$ are naturally higher.

In operation it is important to regulate the heat treatment in the retort so that all of the air oxygen will be consumed in burning the adsorbed matter to $CO_2$ and $H_2O$ and so that these gases will not gassify the original active carbon at the elevated temperatures existing within the retort. The yield of revivified carbon in relation to the original activated carbon depends upon control of the internal heat conditions, the air ratio being constant. This control of the internal heat is obtained by adjustment of the external heat applied and of the relative amount of steam or other cooled inert gases injected into the retort below the ignition zone. The adjustments are made according to the temperatures observed at different points along the length of the retort and also in accordance with the composition of the retort gases. Ordinarily control is effected by adjusting the amount of external heat applied to the retort and the quantity of steam injected, the object being to keep the $CO_2$ content of the exit gases as high as possible. Excessive heat in the retort is indicated by substantial amounts of carbon monoxid in the gases. I have found that almost ideal conditions of yield and acivity of the product are maintained when the exit gases contain by volume about 20 per cent carbon dioxid and 1.8 per cent carbon monoxid with no oxygen and negligible amounts of hydrogen. These conditions are maintained with temperatures within the retort, as shown by pyrometers inserted along its length, ranging from 1100° C. near the top to 600° C. near the bottom. These pyrometers, together with the analysis of the exit gases, give the information needed for the control of the internal heating conditions.

The downward passage of the air current carrying dispersed particles of carbon is, as I have found, advantageous in regularizing the hot gas flow, the "flue effect" being avoided. I have found it usually beneficial to preheat the air and to dry the spent carbon prior to their admixture. By passing the hot gases downward, disturbance by convection and "flue effects" are obviated and it becomes possible to preserve uniformly and continuously the desired temperature differentials between the hot top and the cooler base of the retort.

In the accompanying drawings I have shown more or less diagrammatically apparatus organizations within my invention and useful in carrying on the described process. In this showing, Fig. 1 is a view in vertical section of a revivifying apparatus in which a vertical metallic tube serving as a heating retort is disposed in a combustion chamber enclosed by a refractory lined combustion furnace; and Fig. 2 is a similar view of a vertical brick lined retort heated by means of burners directing flaming combustion gases directly into the retort.

Referring to Fig. 1, a furnace 10 has a combustion chamber 12 in which is placed a vertically disposed tubular retort 14 which may be made of a heat resistant metal or alloy. The tubular retort is heated in its upper portion by means of burners 16 introducing gases for combustion in the chamber 12, the retort being thus externally heated. The furnace is provided with a stack 17.

Supported upon the top end of the tubular retort is mixing chamber 18 provided with an agitating fan comprising paddle wheels 20 adapted to be revolved at a high speed by means of shaft 22 with pulley wheel 24 connected with a motor, not shown. As shown, the mixing chamber is in direct communication through its bottom with the top end of heating retort 14.

Arranged to deliver into the top of the mixing chamber are feed pipe 26 for spent activated carbon and air inlet pipe 28, both of these pipes being provided as shown with stuffing boxes and swing joints to take up expansion resulting from the heating of retort 14. Feed pipe 26 leads from a conveyor 30 which is supplied with spent carbon by feed hopper 32. Air inlet 28 runs through two branch lines 34 and 36 provided with regulating valves and through meter 38 from an air blower, not shown. Either or both of the branch lines may be run through an air preheater such as indicated at 37 for branch 36.

Flanged to the bottom end of retort 14 a collection tank 40 is in open communication with the retort. This collection tank is provided with a gas outlet 42 and with another outlet 44 for the revivified product. The collection tank is also provided with agitating paddles 46 and a baffle 48 facilitating separation in the tank of revivified product from the reaction gases. A water spray 47 may be provided in the gas outlet 42 to aid in separation of the fines from the gases. The gas outlet 42 runs to an exhaust fan, not shown.

Arranged down the length of the retort 14 are pipes 50 extending into the retort and adapted to inject thereinto gases such as steam or products of combustion for the purpose of cooling the materials in the retort as they pass below the combustion zone or for tempering and regulating the heat developed in and applied to the retort. Temperature indicating pyrometer or thermocouple tubes 52 are inserted into the retort at various points down its length. The combustion chamber of the furnace may also be provided with one or more pyrometers 54. The retort is also provided with gas sampling tubes 56 arranged as desired at different points in the retort. A pressure manometer inlet 60 may be arranged in the retort near the bottom end as shown.

In operation, finely divided or powdered spent carbon, which is advantageously predried to a low moisture content, is fed into the top of the mixing chamber at a constant rate which may be adjusted to the desired capacity or rate of throughput. Air is blown into the mixing chamber in a continuous current, the air being usually preheated by well known means. The rate of the air current is carefully regulated in proportion to the constant feed of spent carbon so that the air oxygen is just sufficient to oxidize the adsorbed organic matter in the spent carbon with formation of $CO_2$ and $H_2O$. In the mixing chamber the powdered spent carbon is thoroughly and uniformly dispersed in a regulated air current and the dispersion mixture passes in a continuous downward flow into and through the retort the upper portion of which is maintained at a temperature above 800°, and usually at about 1000 to 1100° C. As a result, the air-carbon dispersion mixture is continuously ignited in the upper portion of the retort and the adsorbed organic matter in the carbon is burned out during the downward passage, cooling gases being injected into the retort below the combustion zone to afford quick cooling of the ignited dispersion mixture below 800° C. So working, time is not afforded for substantial reaction between the $CO_2$ and $H_2O$ of the reaction gases and the activated carbon itself and the pores of the carbon are thoroughly cleared of adsorbed matter without loss of activated carbon. Control of the process is readily effected by observing the temperature within the retort, by sampling and analyzing gases taken from near the bottom of the retort and by carefully regulating the heating of the retort and the input of cooling gases. I have found that steam usually serves best as a cooling and tempering medium, but products of combustion may be used, if desired.

In recovering the reactivated product from the collection tank 40, the carbon is floated or suspended in the water admitted through spray 47, the suspension being aided by the agitating paddles 46. The water suspension flows over baffle 48 and runs out of the collection tank through outlet 44. The removal of the carbon may be aided by a pump (not shown) in outlet line 44.

In a modification of my invention, as illustrated in Fig. 2 the heating retort may be a vertically disposed steel casing 62 lined with insulating refractory material such as ordinary firebrick and provided in its upper portion with burners 64 for introducing gases for combustion in neutral flames within the retort, the gases for such combustion being carefully proportioned so as not to have substantial amounts of either oxygen or combustible gas in excess. The mixing chamber may rest on the top of the retort and be fed with spent carbon and preheated air as described in connection with Fig. 1. The retort is provided with inlet pipes for steam or products of combustion and with pyrometer settings, gas sampling tubes and a manometer connection arranged as described for Fig. 1. From the bottom of the retort, a pipe 65 of heat resistant metal leads into the collection and separating tank.

The operation of the internally heated retort is similar to that of the externally heated retort illustrated in Fig. 1. The products of combustion of the burning gases admitted through burners 64 mingle with the gases produced in ignition of the organic matter of the spent carbon and pass together with such gases through the collection tank below the retort and out through the gas outlet of the collection tank. The reactivated product is separated from the gases and may be removed from the collection tank as described for Fig. 1.

In a particular embodiment of the invention a tubular retort 20 feet high and 2 feet inside diameter is disposed in a furnace arranged for external heating of the retort in its upper portion; the mixing chamber supported upon the tubular retort being 3 feet high by 20 inches inside diameter. A spent carbon used in sugar decolorizing can be revivified in this retort to an activity shown by the usual tests to be substantially equal to that of the original activated carbon. The spent carbon as fed into the retort analyzes as follows:

| | Per cent |
|---|---|
| Moisture | 5 |
| Organic volatile matter (dry basis) | 15.0 |
| Ash (dry basis) | 23.8 |
| Fixed carbon (dry basis) | 61.2 |

First the upper portion of the retort is heated to about 900° C. The spent carbon is then fed into the mixing chamber at a rate of 435 pounds per hour. And at the same time, air is introduced into the mixing chamber at a rate of 4,030 cubic feet per hour, measured at 60° F. and 30 inches of mercury pressure; the air ratio being thus about 65 cubic feet per pound of adsorbed organic matter. Almost immediately, ignition starts within the retort, and the temperature in the upper portion of the retort rises to about 1050° C. The feed of gas to the burners is then cut down, and injection of steam into the lower portion of the retort begins. This injection of steam is controlled as indicated by analysis of the retort gases, so as to effect complete utilization of the air oxygen and to prohibit the formation of CO and $H_2$. Gases taken from the lower end of the retort should analyze 20 per cent $CO_2$ and 1.8 per cent CO for average good operation. The pressure in the tube near the bottom as shown by a manometer connection thereto is kept at about atmospheric. Under conditions of operation as stated, revivified product analyzing on a dry basis 29.5 per cent ash and 70.5 per cent fixed carbon will be discharged from the bottom of the retort at a rate of about 333 pounds per hour; the production thus being about four tons per day of revivified or regenerated spent carbon. Figured on a basis of the respective fixed carbon contents, the yield of reactivated product is about 93 per cent of the original activated carbon, the activity being completely restored with a loss of but 7 per cent of the carbon.

This particular embodiment of the invention is an example of average good operating conditions, but with more exacting control of the reaction within the retort, it is possible to obtain yields of 100 per cent of the original carbon with complete regeneration of its adsorbent power.

What I claim is:—

1. An organization of apparatus useful in revivifying spent activated carbon which comprises a stationary elongated vertically disposed heating retort, a mixing chamber supported above and adapted to deliver into the top of said retort and having conveying means adapted to feed powdered spent carbon into said chamber, adjustable means for introducing air into the chamber and means within said chamber for mixing and dispersing the powdered spent carbon in the introduced air, means for heating the upper portion of the retort, a plurality of inlet pipes in the retort along its length below said heating means for injecting cooling gases into the retort, a collection tank for receiving the revivified product and reaction gases from the bottom of the retort and a gas outlet conduit leading from said collection tank.

2. An apparatus organization as described in claim 1 in which a vertical metallic tubular retort is disposed in a furnace provided with burners heating the retort externally in its upper portion.

3. An apparatus organization as described in claim 1 in which a vertical brick retort is heated in its upper portion by means of burners carrying flaming combustion gases into the retort.

4. A process for revivifying spent activated carbon containing adsorbed organic matter by igniting a dispersed mixture of the spent carbon with air and selectively burning out said adsorbed matter which comprises forming a dispersed mixture of spent carbon in powdered form in a continuous current of air, regulating the air current in a relative amount limited to that required to oxidize the adsorbed organic matter, passing said dispersion mixture into and vertically downward through a vertically disposed reaction zone maintained at temperatures of about 800° to 1100° C. so as to ignite the mixture, continuing the downward passage of the ignited dispersion mixture of carbon and reaction gases and quickly cooling the mixture to prevent secondary reactions during said downward passage and then separating the revivified carbon from the gaseous reaction products.

5. A process as described in claim 4 wherein the ignited dispersion mixture is cooled in its downward passage by injecting steam into said mixture after said ignition.

6. A process as described in claim 4 wherein the cooling is by injection of products of combustion into the dispersion mixture after its ignition.

RAYMOND G. DAVIS.